Nov. 13, 1923.  
R. L. WHIPPLE ET AL  
1,474,099  
AUTOMATIC TIRE PRESSURE GAUGE  
Filed April 8, 1922  2 Sheets-Sheet 1
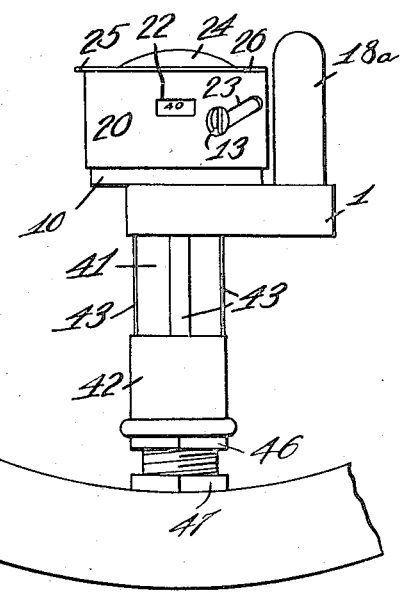
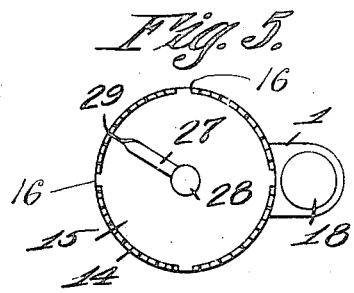
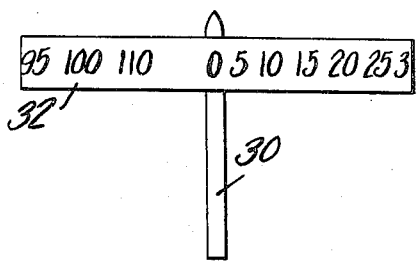
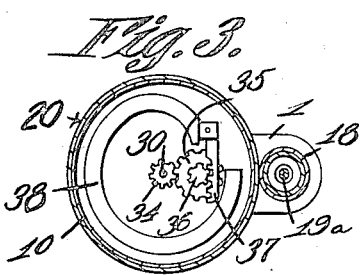
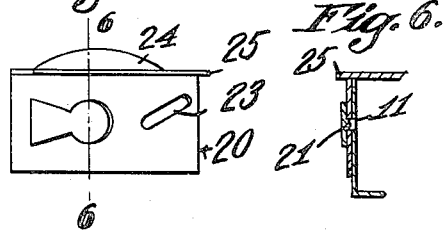
R. L. Whipple  
D. P. Rockwell and  
C. C. Featherstone Inventor

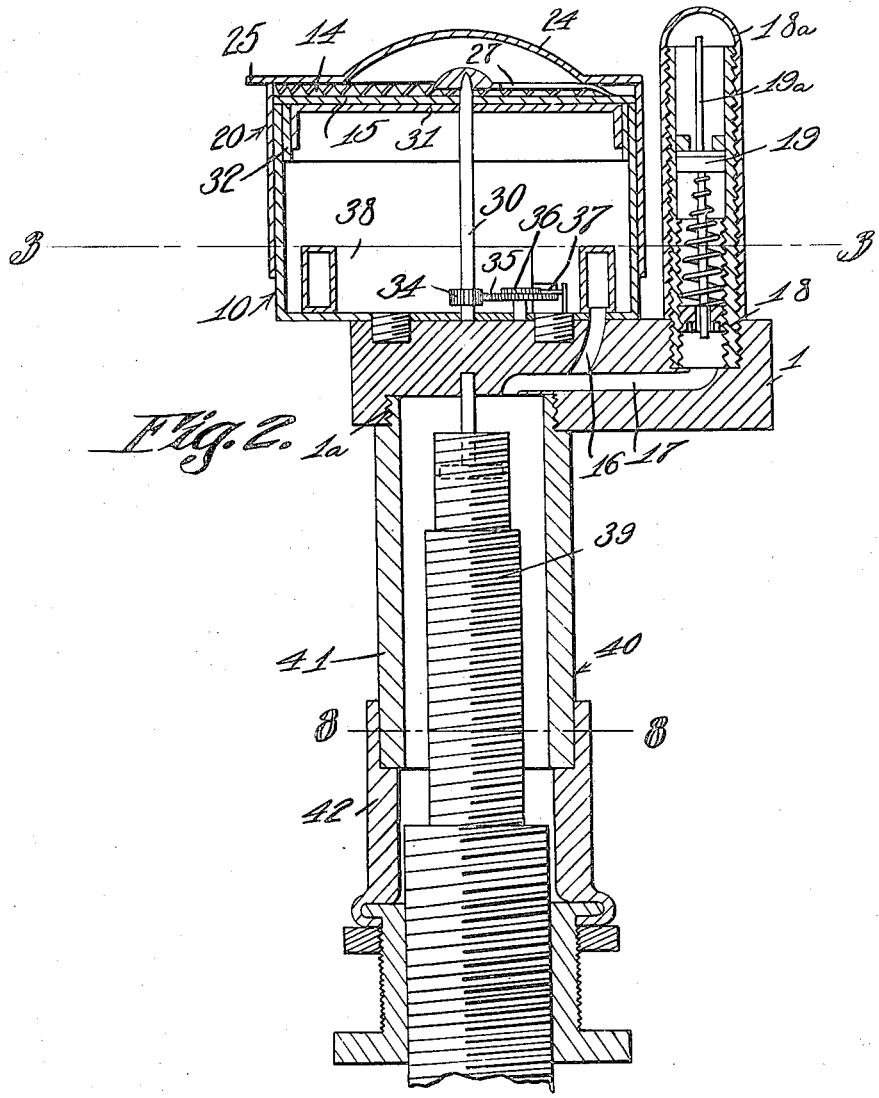
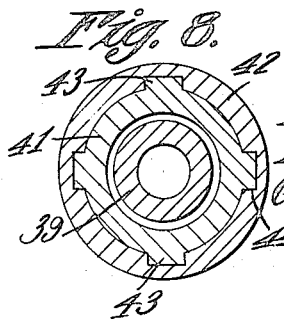

Patented Nov. 13, 1923.

1,474,099

UNITED STATES PATENT OFFICE.

RAYMOND L. WHIPPLE, DAVID P. ROCKWELL, AND CHASE C. FEATHERSTONE, OF LEHI, UTAH.

AUTOMATIC TIRE-PRESSURE GAUGE.

Application filed April 3, 1922. Serial No. 550,326.

*To all whom it may concern:*

Be it known that we, RAYMOND L. WHIPPLE, DAVID P. ROCKWELL, and CHASE C. FEATHERSTONE, citizens of the United States, residing at Lehi, in the county of Utah and State of Utah, have invented a new and useful Automatic Tire-Pressure Gauge, of which the following is a specification.

This invention relates to air pressure gauges for pneumatic tires and the like.

The object of the invention is to provide an automatic air pressure gauge which is designed to be normally carried by the tire valve tube so as to be ready for use at all times when air is supplied to the tire indicating at a glance the pressure in the tire.

Another object is to provide a simply constructed device of this character which is thoroughly protected against dust and dirt and in which the gauge is locked on the lowering of the top and released on the raising thereof.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of this improved gauge shown applied.

Fig. 2 is an enlarged transverse vertical section thereof.

Fig. 3 is a horizontal section taken on the line 3—3 of Fig. 2.

Fig. 4 is a side elevation of the housing top removed.

Fig. 5 is a plan view of the housing with the top removed.

Fig. 6 is a detail sectional view taken on the line 6—6 of Fig. 4.

Fig. 7 is a detail side elevation of the dial carrying member.

Fig. 8 is a transverse section taken on the line 8—8 of Fig. 2.

In the embodiment illustrated, the gauge constituting this invention comprises a base 1 here shown in the form of a casting having a dial encasing shell or housing 10 detachably mounted thereon being connected therewith by screws or any other suitable means. This housing 10 is equipped with a removable cap-like closure or top 20 adapted to be raised or lowered on the turning thereof in opposite directions on the housing. The top when lowered will be yieldably locked by a spring carried tooth or spur 21 which enters a depression 11 in the housing.

The housing 10 has a side opening 12 in one side wall thereof which registers with a similar opening 22 in the side wall or flange of top 20 when the latter is in raised position and through which is visible the indicia on the dial presently to be described, which is encased by the housing and discloses the pressure in the tire in connection with which the device is used.

Radially extending headed studs 13 carried by the outer face of the side wall of the housing 10 extend through inclined cam-like slots 23 in the side walls of the cover 20 for guiding the cover to raise or lower it according to the direction in which the top is turned. This top 20 and the housing 10 are cylindrical in form and the top 20 has an upwardly bulged or dome like central portion 24 to provide for the housing therein of a locking finger or arm 27. This arm 27 is carried by the upper end of the dial carrying spindle 30 and rotates therewith and is provided at its outer end with an edge 29, which when the cap or cover 20 is lowered is forced thereby into locking engagement with one of a plurality of notches 14 formed in the upper edge of the housing 10 (see Fig. 5.)

Cap 20 has a laterally projecting flange 25 provided with a cut out portion or notch 26 to form finger grips for rotating the cap.

The housing 10 has a removable disk-like closure 15 which fits within the housing and has a plurality of radially extending teeth or spurs 16 to enter between the notches 14 and thereby hold said closure engaged with the housing.

The spindle 30 extends through and is journaled centrally in said disk-like closure the locking finger 27 being secured thereto above the closure. A cross bar 31 is fixed to the spindle 30 and carries an annular dial 32 with indicia on its perimeter to show the pressure of the air in the tire under certain conditions. This spindle 30 is journaled at its inner end in the bottom of the housing 10 and has fixed thereto a pinion 34 which meshes with a gear 35 rotatably mounted on said housing bottom and having a cog wheel 36 superposed thereon and fixed thereto. The cog 36 meshes with a rack 37 hinged to the free end of a convolute expansion tube 38 so that when said tube expands the rack is moved out and rotates cog 36 which through gear 35 and pinion 34 transmits the motion to the spindle 30 rotating said spindle and turning the dial 32 to disclose through the sight openings the number of pounds of air pressure in the tire.

An air passage 16 in the base 1 opens through the bottom of housing 10 into the tube 38 and connects with another passage 17 in the base. The passage or conduit 17 communicates at one end with a tube 18 which has threaded engagement with said base and extends to a point above the housing 10 to a sufficient distance to permit an air hose connection to be made with said tube. A check valve 19 is mounted in tube 18 and is equipped with the usual stem 19$^a$ for engagement by the hose nozzle to open the valve and permit air under pressure to be forced through tube 19 and passage 17 to the tire through the usual valve carried by the tire.

A dust cap 18$^a$ is removably mounted on tube 18 to protect it. Base 1 has a threaded socket 1$^a$ in its lower face to be positioned over the valve tube 39 of a tire and has a valve release pin 1$^b$ depending therefrom which is designed to enter tube 39 and open the valve and hold it open while the gauge is attached thereto.

A dust protector 40 surrounds the tube 39 and is composed of two telescoping sections 41 and 42 having interengaging ribs and grooves 43 and 44 respectively to permit sliding engagement of the sections and prevent turning of one section relatively to the other, section 42 being swivelled on a nut 47 which has a laterally extending flange 45 at its upper end to enter and rotatably engage a groove 42$^a$ in the lower end of section 42. A lock 46 is carried by nut 47 and is designed to lock nut 47 to section 42.

In the use of this gauge which is applied to the valve tube 39 of the tire and normally retained thereon, as shown in Figs. 1 and 2, when it is desired to ascertain the pressure contained in the tire the cap 20 is released from the housing 10 by disengaging the spring pressed tooth 21 from the recess 11 in said housing, and said cap is turned toward the left to raise it on said housing and bring the sight openings in the cap and housing into register so that the digits carried by the dial 32 will be visible through said sight openings and disclose the pressure contained in the tire. The air under pressure in the tire passes up through the tube 39 of the tire valve passage 17 and branch passage 16 and enters the expansion tube 38 thus causing said tube to expand according to the pressure of the air in the tire and thereby move the rack 37 which will rotate cog 36 and gear 35 imparting motion to the pinion 34 which rotates the spindle 30 thereby turning dial 32 and bringing the number opposite the sight openings which discloses the number of pounds of air pressure in the tire.

When air is to be inserted in the tire the dust cap 18$^a$ is removed and the nozzle of the air hose placed over the tube 18 which will operate to open the check valve 19 and permit the air to enter through tube 18, passage 17 and valve tube 39 to the tire. At the same time the air will pass through the branch tube 16 and the expansible tube 38 of the gauge indicating to the user the number of pounds in the tire, so that he may disconnect the hose when the desired pressure is reached.

After the tire has been inflated and the air hose disengaged from tube 18 the dust cap 18$^a$ is replaced and the cap 20 turned down until the spring pressed tooth 21 enters the recess 11 in the wall of the housing 10 which will lock the cap in lowered position. The lowering of the cap operates to clamp the locking arm or finger 27 in engagement with one of the notches 14 of the housing 10 and thereby prevent actuation of the gauge when the parts are in this position so that there will be no danger of breakage of the parts incident to vibrations caused by the passage of the wheel over rough roads and the like.

We claim:

1. In an air pressure gauge of the class described, a housing including telescoping members, pressure indicating means located in said housing, and means connected with said indicating means positioned in the path of one of said housing members to be engaged by said member when in closed position to lock said indicating means against operation.

2. In an air pressure gauge of the class described, a housing including telescoping members, pressure indicating means located in said housing, one of said housing members and said indicating means having cooperating elements for engagement on the inward movement of the other housing member to lock said indicating means against operation.

3. In an air pressure gauge, a housing including telescoping members, pressure indicating means located in said housing, one of said housing members having notches in its upper edge, a laterally extending arm carried by said indicating means and having a finger located in the path of the other housing member and adapted to enter one of said notches when said last mentioned housing member is moved inwardly and thereby locking said indicating means against operation.

4. In an air pressure gauge, a housing including telescoping members closed at their outer ends, a closure for the inner end of the inner member, a spindle journaled in the ends of said inner member, an expansion tube in said member having an air inlet opening thereinto and connection between said tube and spindle whereby the expansion or contraction of the tube will rotate the spindle, an indicia carrying dial movable with said spindle and sight openings in said members operable on the movement of one of said members to disclose the indicia on the dial which indicates the pressure of the tire being gauged.

5. In an air pressure gauge, a casting having threaded sockets in its upper and lower faces for the connection of air tubes thereto, a passage connecting said sockets and a branch passage leading through said casting from said passage, a housing mounted on said casting and having an opening in the bottom thereof communicating with said branch passage, a convolute expansion tube located in said housing and communicating with an opening to said branch passage, a dial mounted in said housing, and a connection between said dial and tube whereby the expansion or contraction of the tube will rotate the dial, said housing having a sight opening for reading of the dial.

In testimony that we claim the foregoing as our own, we have hereto affixed our signatures in the presence of two witnesses.
RAYMOND L. WHIPPLE.
DAVID P. ROCKWELL.
CHASE C. FEATHERSTONE.
Witnesses:
O. A. SLADE,
JOSEPH W. GOATES.